(12) United States Patent
Johnson et al.

(10) Patent No.: US 6,577,929 B2
(45) Date of Patent: Jun. 10, 2003

(54) MINIATURE ATTITUDE SENSING SUITE

(75) Inventors: William M. Johnson, Sudbury, MA (US); Howard Musoff, Brookline, MA (US); Darryl G. Sargent, Wayland, MA (US); Jerold P. Gilmore, Westford, MA (US); Cornelius J. Dennehy, Severna Park, MD (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 10/058,964

(22) Filed: Jan. 28, 2002

(65) Prior Publication Data
US 2003/0023355 A1 Jan. 30, 2003

Related U.S. Application Data
(60) Provisional application No. 60/264,436, filed on Jan. 26, 2001.

(51) Int. Cl.$^7$ ................................................ G06F 7/00
(52) U.S. Cl. ........................ 701/4; 701/13; 701/222; 701/226; 244/169; 244/165; 244/171
(58) Field of Search ............................ 701/4, 3, 13, 222, 701/226; 244/169, 165, 171, 164; 342/357.01, 357.14

(56) References Cited

U.S. PATENT DOCUMENTS

| | | | |
|---|---|---|---|
| 3,188,472 A | 6/1965 | Whipple, Jr. | 250/394 |
| 3,263,944 A | 8/1966 | Watson | 244/3.18 |
| 3,286,953 A | 11/1966 | Dryden | 244/171 |
| 3,301,508 A | 1/1967 | Yamron | 244/3.18 |
| 3,360,638 A | 12/1967 | Lillestrand et al. | 701/222 |
| 3,365,147 A | 1/1968 | Wolfe | 244/169 |
| 3,381,569 A | 5/1968 | Hatcher | 356/4.03 |
| 3,448,272 A | 6/1969 | Slater | 250/203.6 |
| 3,483,384 A | 12/1969 | Pinson | 250/201.1 |
| 3,488,504 A | 1/1970 | Lowen et al. | 250/206 |
| 3,521,835 A | 7/1970 | Braga-Illa et al. | 244/171 |
| 3,628,018 A | 12/1971 | Desvignes | 250/351 |
| 3,769,710 A | 11/1973 | Reister | 62/63 |
| 3,827,807 A | 8/1974 | Fletcher et al. | 356/63 |
| 4,674,715 A | 6/1987 | Frisch | 244/139.02 |
| 4,680,718 A | 7/1987 | Sasaki et al. | 701/222 |
| 4,786,018 A | 11/1988 | Cope | 244/164 |
| 4,801,202 A | 1/1989 | Wilcox | 356/139.01 |
| 5,107,434 A | 4/1992 | Paluszek | 701/222 |
| 5,177,686 A | 1/1993 | Böinghoff et al. | 701/226 |
| 5,189,295 A | 2/1993 | Falbel | 250/206.2 |
| 5,223,702 A | 6/1993 | Conley | 250/203.6 |
| 5,412,574 A | 5/1995 | Bender et al. | 701/222 |
| 5,546,309 A | 8/1996 | Johnson et al. | 701/13 |
| 5,647,015 A | 7/1997 | Choate et al. | 382/103 |
| 5,788,188 A | 8/1998 | Damilano | 244/165 |
| 5,810,297 A | 9/1998 | Basuthakur et al. | 244/176 |
| 5,837,894 A | 11/1998 | Fritz et al. | 73/178 R |
| 5,870,486 A | 2/1999 | Choate et al. | 382/103 |
| 5,884,869 A | 3/1999 | Fowell et al. | 244/169 |
| 5,963,166 A | 10/1999 | Kamel | 342/357.01 |
| 5,996,941 A | 12/1999 | Surauer et al. | 244/165 |

(List continued on next page.)

FOREIGN PATENT DOCUMENTS

| | | | | |
|---|---|---|---|---|
| WO | WO 97/11882 | 4/1997 | | B64G/1/36 |

Primary Examiner—William A. Cuchlinski, Jr.
Assistant Examiner—Marthe Y. Marc-Coleman
(74) Attorney, Agent, or Firm—Testa, Hurwitz & Thibeault, LLP

(57) ABSTRACT

The present invention provides methods of and apparatus for determining the inertial attitude of an aerospace vehicle. In one embodiment, the invention provides a rotational astronomical object-sighting concept to determine the inertial attitude of an axis of the aerospace vehicle without the star identification or dragback. In another embodiment, the invention provides an attitude measurement apparatus comprising a high sensitivity optical sensor and a low power inertial sensor.

22 Claims, 13 Drawing Sheets

1 - STAR

RADIUS $R_1$

2 - STARS

RADII $R_1, R_2$

3 - STARS

RADII $R_1, R_2, R_3$

U.S. PATENT DOCUMENTS

| | | | |
|---|---|---|---|
| 6,012,000 A | 1/2000 | Holmes et al. | 701/13 |
| 6,043,778 A | 3/2000 | Froeberg et al. | 342/357.14 |
| 6,047,226 A | 4/2000 | Wu et al. | 701/13 |
| 6,098,929 A | 8/2000 | Falbel | 244/171 |
| 6,102,338 A | 8/2000 | Yoshikawa et al. | 701/13 |
| 6,108,593 A | 8/2000 | Didinsky et al. | 701/13 |
| 6,145,378 A | 11/2000 | McRobbie et al. | 73/490 |
| 6,145,790 A | 11/2000 | Didinsky et al. | 244/164 |
| 6,152,403 A | 11/2000 | Fowell et al. | 244/165 |
| 6,163,021 A | 12/2000 | Mickelson | 244/3.2 |
| 6,227,496 B1 * | 5/2001 | Yoshikawa et al. | 244/171 |
| 6,236,939 B1 | 5/2001 | Wu et al. | 701/222 |
| 6,237,876 B1 | 5/2001 | Barker | 244/164 |
| 6,253,125 B1 | 6/2001 | Barker | 701/13 |
| 6,266,616 B1 | 7/2001 | Needelman | 701/222 |
| 6,272,432 B1 | 8/2001 | Li et al. | 701/222 |
| 6,470,270 B1 * | 10/2002 | Needelman et al. | 701/222 |

* cited by examiner

MINIATURE ATTITUDE SENSING SUITE

CROSS REFERENCE TO RELATED APPLICATIONS

The present application claims the benefit of and priority to U.S. provisional patent application No. 60/264,436, filed Jan. 26, 2001, the entire disclosure of which is herein incorporated by reference.

FIELD OF THE INVENTION

The invention relates to the field of guidance, navigation, and control avionics. In particular the invention relates to inertial attitude sensors.

BACKGROUND OF THE INVENTION

Attitude determination is crucial to the flight of both aeronautical and space vehicles. In particular, attitude determination for both spinning and three-axis stabilized satellites is a critical operational function.

However, a choice must typically be made between the accuracy of the attitude determination and the size, weight, power and computational requirements of the associated system or methods. Although attitude determination is critical, these are not simple choices because space, weight, power and computational resources are at a premium in aeronautical and space vehicles. Moreover, space, weight, power and computational resources become even more scarce as the size of the aeronautical or space vehicle decreases.

A need therefore exists for apparatus and methods that can provide sufficiently accurate attitude determination with reduced space, weight, power and/or computational requirements.

SUMMARY OF THE INVENTION

In one aspect, the invention provides methods for measuring the inertial attitude of an aeronautical or space vehicle (hereinafter collectively referred to as "aerospace vehicle"). In one embodiment, the methods provide the inertial attitude for a spinning aerospace vehicle. In another embodiment, the methods provide the inertial attitude of a substantially non-spinning (e.g., 3-axis stabilized) aerospace vehicle.

The methods employ a rotational astronomical object-sighting concept wherein radii measurements of curved astronomical object tracks of three or more astronomical objects observed by an optical sensor in the coordinate reference frame of an aerospace vehicle, are used to obtain the direction of an axis of the vehicle. In one embodiment, the methods determine the direction, or inertial attitude, of an axis in the right ascension/declination reference frame. In another embodiment, the methods of the invention further determine the roll angle of the aerospace vehicle with respect to an axis, in addition to the inertial attitude of the axis. In general, the invention eliminates the need to implement complex drag-back schemes that use inertial sensor (e.g. gyroscopes) measured motion to drag-back the image of the astronomical object over the astronomical object sighting scan. In addition, the methods of the invention eliminate the need to identify the individual astronomical objects in order to determine the inertial attitude of an axis.

In other embodiments, the methods of the invention use inertial sensor information to enhance the accuracy of the determination of the inertial attitude of an axis by using the inertial sensor information to compensate for nutation of the aerospace vehicle.

In various embodiments, the methods are adapted for a spinning aerospace vehicle. In one embodiment, the aerospace vehicle spins at a rate of 20 rpm However, it is to be understood that the spin rate may be substantially higher or lower than 20 rpm, without deviating from the scope of the invention. In the embodiments adapted for a spinning aerospace vehicle, the field-of-view (FOV) of the optical sensor is oriented along the spin vector, which preferably is directed towards a substantially fixed location in the celestial sphere such as, for example, the ecliptic pole of the solar system. The star field near the spin axis may be known a priori—based on the aerospace vehicle mission—thus simplifying any star pattern recognition task or it may be unknown, the so-called "lost-in-space" scenario. The detected astronomical objects track out a circular arc in the field-of-view about the spin axis, which is substantially centered in the field-of-view. The signal associated with the astronomical object track, or tracks, may be integrated over time to improve the signal-to-noise ratio. In this configuration, the spin axis of the optical sensor is relatively stable in inertial space so that putative pitch/yaw motion measured by an inertial sensor (e.g., such as a MEMS gyroscope) must arise substantially from inertial sensor drift. A processor, using the measured putative pitch/yaw motion, can measure this drift and compensate for it. In another embodiment, the inertial sensor (gyroscope) drift is also updated by an external measurement, such as a sun sensor or earth horizon sensor, to provide a roll angle update. However, as noted previously, roll angle update is not critical to or for the radii measurements.

In other embodiments, the method is adapted for a non-spinning aerospace vehicle (e.g., a 3-axis stabilized satellite). In various versions of these embodiments the curved astronomical object tracks are generated by servo-controlled optical sensor rotational motion rather than a free spinning aerospace vehicle.

The invention provides several advantages to the field of inertial attitude sensing and determination. For example, the rotational astronomical object-sighting concept of the invention eliminates the need for drag-back yet provides a substantially equivalent integration of astronomical object sighting data compared to that traditionally obtained with drag-back procedures. Eliminating drag-back simplifies inertial attitude determination and reduces the need for on-board processing and/or the need for data downlinking. The rotational astronomical object-sighting concept also reduces the requirement for very accurate knowledge of the roll gyroscope (about the spin axis) scale factor error. The radii measurements are substantially orthogonal to the roll gyroscope error and therefore are substantially unaffected by the roll gyro scale factor error accumulation during large angle rotations. As a result, the methods of the invention increase the viability of using less-accurate gyroscopes (which are typically smaller, lighter and require less power than high accuracy gyroscopes) in an attitude senor without a significant performance penalty. Accordingly, various embodiments of the invention provide an inertial attitude sensor, or sensor suite, that combines small size, low power requirements and simplicity of operation with high accuracy inertial attitude determination.

In another aspect, the invention provides an attitude determination system to determine the inertial attitude of an axis of an aerospace vehicle. In one embodiment, the system comprises an optical sensor, a first memory element to store the radii of astronomical object tracks, a second memory element to store the coordinates of a plurality of astronomical objects, and an attitude processor adapted to determine the attitude of an axis.

In another aspect, the invention provides an attitude measurement apparatus comprising a high sensitivity optical sensor and a low power inertial sensor. Although low power inertial sensors typically have only modest performance (e.g., drift, scale factor error, alignment, etc), the invention provides a system synergy where the modest performance of the inertial sensor is enhanced by the high sensitivity optical sensor, which is adapted to operate as a star tracker (stellar camera), and the inertial sensor is adapted to increase the accuracy of the astronomical object tracking operation of the optical sensor. In one embodiment, the optical sensor comprises an electron bombarded charge coupled device (EBCCD) and the inertial sensor comprises a microelectromechanical system (MEMS) gyroscope. In another embodiment, the invention further comprises calibration algorithms and/or Kalman filters that can model the temperature disturbance of the inertial sensor and further improve inertial sensor performance.

In one embodiment, the high sensitivity optical sensor can track dim astronomical objects (e.g., those of relative magnitude 8 or higher) and is not limited to tracking brighter objects. Accordingly, the invention can use a small field-of-view (FOV) for the optical sensor. Limiting the FOV decreases the number of astronomical objects candidates and simplifies astronomical object pattern recognition. Simplifying astronomical object recognition reduces data processing requirements, which in turn reduces power requirements. This further simplifies astronomical object pattern recognition and also mitigates inertial sensor errors such as gyroscope scale factor.

In another embodiment, a large optical sensor FOV is used to accommodate the multiple astronomical objects (e.g., astronomical objects with relatively bright stellar magnitudes). Using a large FOV means that larger system errors can be corrected for using the astronomical object sighting. Such errors include, but are not limited to, aerospace vehicle tilt, gyroscope drift, optical sensor and/or gyroscope misalignment, launch navigation errors, and launch azimuth errors.

In another aspect, the invention provides an article of manufacture where the functionality of one or more of the methods of the invention are embedded on a computer-readable program means, such as, but not limited to, a floppy disk, a hard disk, an optical disk, a magnetic tape, a PROM, an EPROM, CD-ROM, or DVD-ROM.

BRIEF DESCRIPTION OF THE DRAWINGS

The invention is pointed out with particularity in the appended claims. However, the advantages of the invention described above, together with further advantages, may be better understood by referring to the following description taken in conjunction with the accompanying drawings. The drawings are not necessarily drawn to scale, and like reference numerals refer to the same parts throughout the different views.

DETAILED DESCRIPTION

Many aerospace vehicle operations can be conducted just with knowledge of the spin axis direction. Other operations require knowledge of both the spin axis direction and roll angle of the vehicle. The invention, in one embodiment provides a device and methods for determining both the spin axis direction and the roll angle.

According to the illustrative embodiment, the methods of the invention employ a rotational astronomical object-sighting concept, wherein radii measurements of curved astronomical object tracks of three or more astronomical objects, made in the coordinate reference frame of an optical sensor of an aerospace vehicle, are used to obtain the direction (i.e., inertial attitude) of an axis of the vehicle. Preferably, the direction of an axis is determined in the right ascension/declination (RA/DEC) coordinate frame, but the invention may use any suitable coordinate frame. The radii measurements of these tracks are substantially independent of coordinate frame; as a result, the equivalent radii in the right ascension/declination coordinate frame may be determined by dividing the measured radii in the focal plane by the focal length of the optical sensor. The inertial attitude of the axis of the aerospace vehicle may then be determined using the resulting radii expressed in angular radians in the right ascension/declination coordinate frame. Using the methods of the invention, a unique solution for the inertial attitude of an axis of an aerospace vehicle can be determined from the curved astronomical object tracks of three or more non-co-linear astronomical objects. Three astronomical objects are non-co-linear objects, for example, when a great circle arc in the RA/DEC coordinate frame cannot be drawn through all three objects.

The methods of the invention may use tracks from a wide variety of astronomical objects including, but not limited to, nebula, planets, stars and galaxies. Preferably, the astronomical object is a stellar object, such as, for example, a star. Accordingly, although the embodiments below are often described in terms of using star tracks for the sake of conciseness, the methods of the invention are not limited to using star tracks. Rather, the embodiments below may use tracks of any suitable astronomical object.

Curved astronomical object tracks may be obtained in several ways. For example, such tracks may be obtained by placing an optical sensor substantially along the spin axis of a spinning aerospace vehicle. Alternatively, the optical sensor may be rotated about a spin axis to obtain curved tracks. In addition, the optical sensor may be rotated about a spin axis of a spinning aerospace vehicle. Accordingly, the term spin axis refers to the spin axis of a spinning aerospace vehicle or the axis about which the optical sensor is rotated.

Figure 1A:
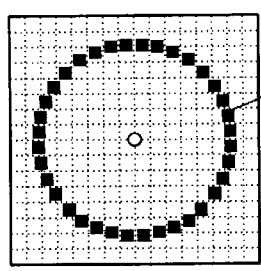
FIGS. 1A–1C are graphical illustrations of one embodiment of substantially circular astronomical object tracks.
Figure 1B:
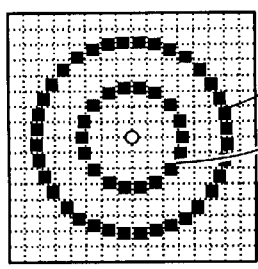
Figure 1C:
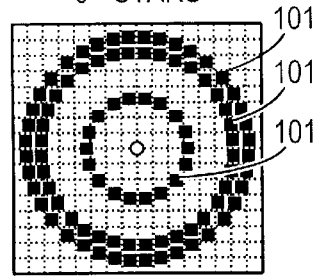

A graphical illustration of astronomical object tracks as they may appear, for example, on a CCD array are shown in FIGS. 1A–1C. FIG. 1A illustrates the track 101 as it may appear for a single detected astronomical object, FIG. 1B as the tracks 101 may appear for two astronomical objects, and FIG. 1C for three astronomical objects. Although it is possible according to the methods of the invention to determine the spin axis from the radii of tracks for two astronomical objects, or even from the radius of the track of just one astronomical object, it is preferred that the radii from the tracks of three or more astronomical objects be used.

Preferably, a curved astronomical object track is substantially circular to facilitate determination of its radius. Although preferred, substantially circular tracks are not necessary to determine the radii used in the methods of the invention. Rather, arcs, portions of a substantially circular track, and elliptical tracks may be used to determine a radius based, for example, on the distance of the track from the center of the FOV of the optical sensor and/or the spin axis.

Figure 2A:
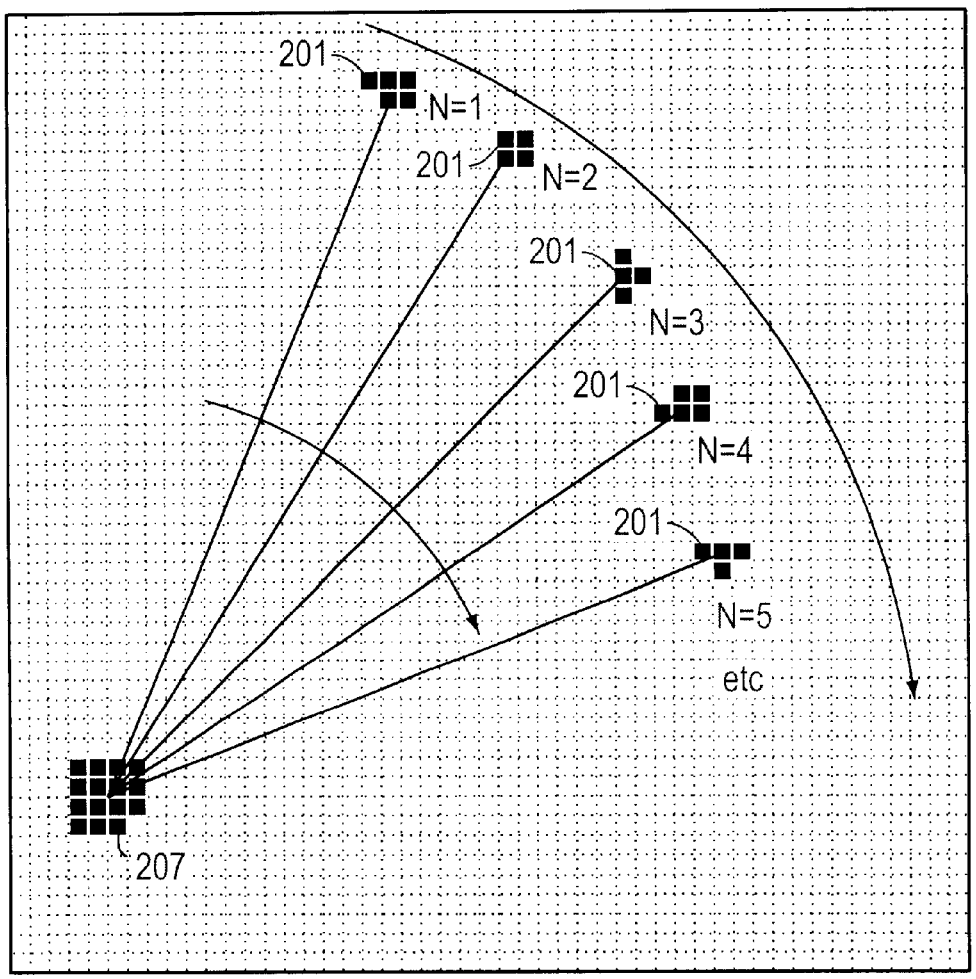
FIGS. 2A and 2B are graphical illustrations of one embodiment of a method for determining a radius from a substantially circular astronomical object track.
Figure 2B:
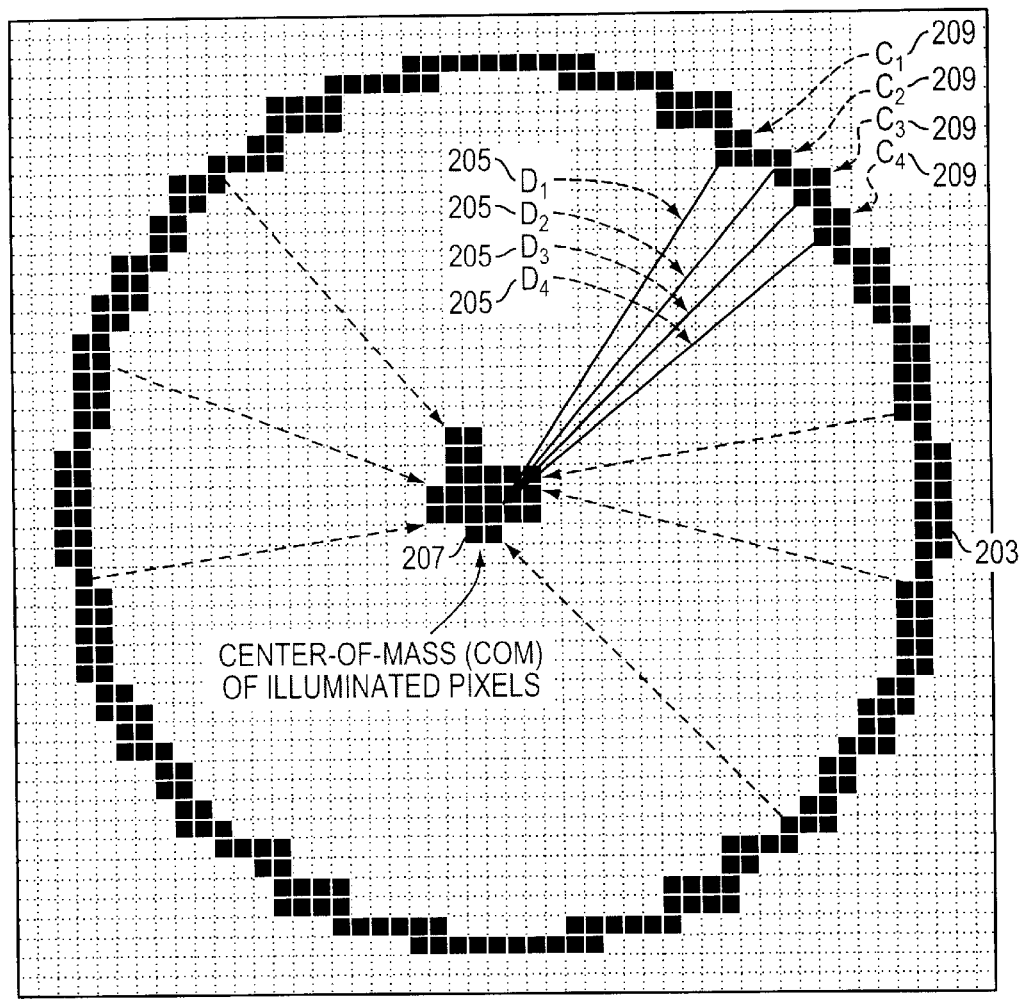
Figure 3:
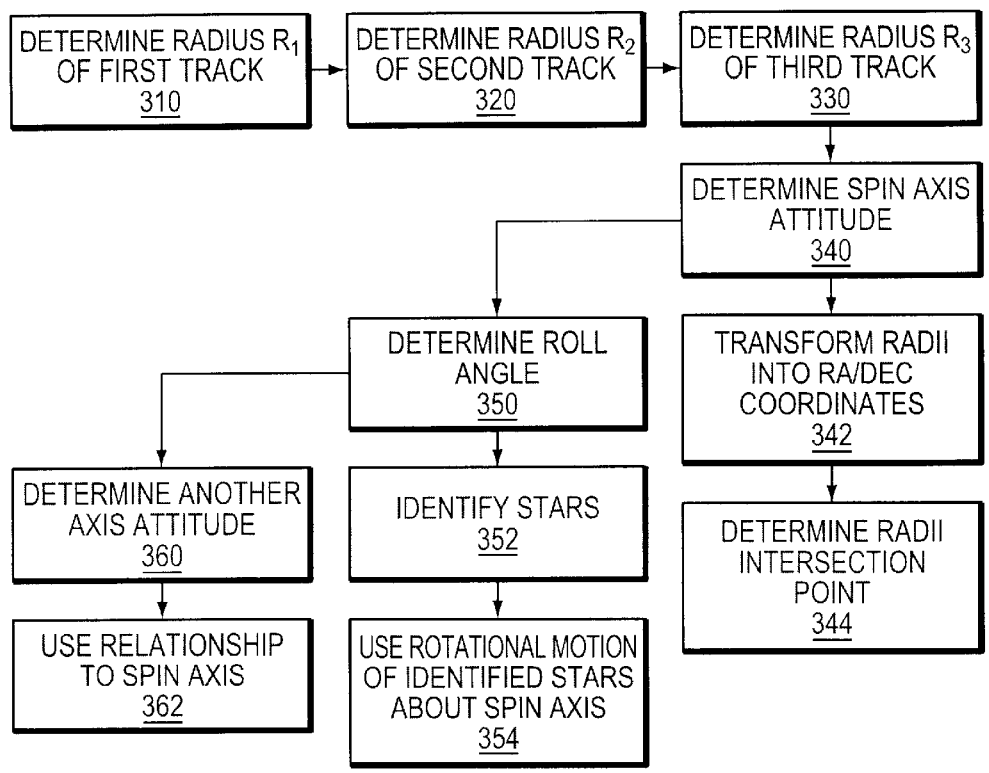
FIG. 3 is a diagram illustrating various embodiments of methods of the invention.

Referring to FIGS. 2A and 2B, one embodiment of determining the radius of an astronomical object track is illustrated. The embodiment illustrated in FIGS. 2A and 2B is for a star track as it may appear on a two-dimensional sensor array of an optical sensor such as, for example, a CCD array. As illustrated, the astronomical object track is comprised of a plurality of frames 201 that when presented together appear as a substantially circular astronomical object track 203. The number of frames N is determinable from the frame rate of the optical sensor and rotational period of the optical sensor about the spin axis. The radius of the astronomical object track is determined from the average distance $D_N$ 205 between the center-of-mass (COM) 207 of the illuminated pixels in each frame and the centroid of a frame $C_N$ 209. The COM is the intensity weighted average of the pixels in all the frames. The x-coordinate of the COM is given by $$COM_x = \left(\sum_N x I_{xy}\right) / \sum_N I_{xy}, \quad \text{Eq. (1)}$$

and the y-coordinate of the COM is given by $$COM_y = \left(\sum_N y I_{xy}\right) / \sum_N I_{xy}, \quad \text{Eq. (2)}$$

where x is the x-coordinate of a pixel, y is the y-coordinate of a pixel, and $I_{xy}$ is intensity of the pixel. A distance $D_N$ may then be determined with geometry using the x and y coordinates of the COM and centroid $C_N$.

In one embodiment, the methods of the invention include a step of compensating for aerospace vehicle nutation in the determination of the attitude of an axis of the vehicle. Nutation of the spin axis of the vehicle may produce radial oscillations in the astronomical object tracks and thereby introduce inaccuracy into the radii determinations. In one embodiment, the methods compensate for these oscillations using information from an inertial sensor on the pitch and yaw motion of the vehicle about the spin axis. Preferably, the pitch and yaw information is used to correct the astronomical object track data for nutation prior to determination of a radius.

Referring to FIGS. 3–5B, various embodiments of methods of the invention are illustrated. The practice of these methods as discussed below is in the context of stars as the astronomical objects, substantially circular star tracks, and axis directions in RA/DEC coordinates. As discussed above, it is to be understood that the specifics of the astronomical object, circularity of object track, and coordinate system are not central to the methods of the invention, but are discussed herein to better illustrate these methods.

The methods begin with obtaining the radii of one or more star tracks. The radii may be provided and/or determined. In one embodiment, the method first determines the radii of a first curved star track 310 designated $R_1$, the radii of a second curved star track 320 designated $R_2$, and the radii of a third curved star track 330 designated $R_3$. The method then determines the spin axis of the aerospace 340 using the three radii, $R_1$, $R_2$, $R_3$. The radii, typically given in the coordinate frame of the optical sensor, are transformed into RA/DEC coordinates 342. According to the invention, where the tracks arise from three non-co-linear stars there exists a single point in the RA/DEC coordinate frame where one circle of radius $R_1$, one of radius $R_2$, and one of radius $R_3$ intersect, where each circle is centered on the RA/DEC coordinates of a different star. The RA/DEC coordinates of this intersection point give the RA/DEC coordinates of the spin axis. As a result, the methods determine the intersection point of the radii 344 to determine the spin axis attitude. FIGS. 4A–4D, discussed further below, provide a graphical illustration of one embodiment of determining the intersection point of the radii 344.

To determine the intersection point, the methods of the invention do not need to identify which star is the source of which star track and associated radius. Rather, the methods may consider any star potentially detectable by the optical sensor as a candidate for a star track and then proceed to center circles of radii $R_1$, $R_2$, $R_3$ on all possible 3 star combinations of these stars to find the intersection point. Further, since the methods do not need to identify the stars, it is not necessary to consider all possible 3 star permutations. As a result, the methods of the invention permit spin axis attitude determination in a "lost-in-space" situation.

As discussed above, the methods of the invention do not need to identify which star is the source of which star track and associated radius. FIGS. 4A–4D provide a graphical illustration of this feature of the invention. For clarity, FIGS. 4A–4D consider only six stars and radii from three star tracks, however, it is to be understood that any number of stars and star tracks may be considered.

Figure 4A:
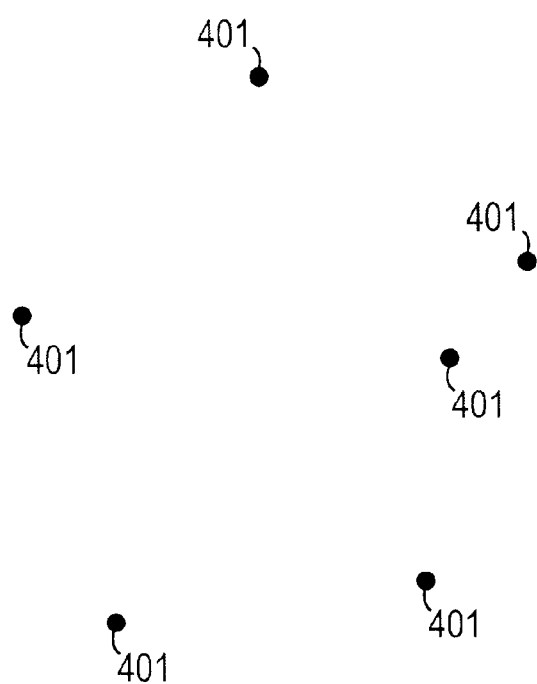
FIG. 4A is a graphical illustration of an astronomical object catalog.

FIG. 4A is a graphical illustration of the candidate stars 401 plotted according to their RA/DEC coordinates. As a result, each point in the plane of FIG. 4A represents a unique set of RA/DEC coordinates. Preferably, the candidate stars 401 include only those stars detectable by the optical sensor (e.g., all stars of sufficient magnitude in the optical sensor's FOV). It is further preferred that every combination of three candidate stars 401 that may appear together in the FOV of the optical sensor appear as non-co-linear astronomical objects. Three astronomical objects appear as non-co-linear objects, for example, when a great circle arc in the RA/DEC coordinate frame cannot be drawn through all three objects. However, it is critical that at least one star track, and preferably three or more star tracks, correspond to candidate stars. Accordingly, it is preferred to include as candidate stars those stars that are beyond what may be considered a practical detection limit of the optical sensor (e.g., those stars an order of magnitude fainter than the putative detection limit of the optical sensor).

Figure 4B:
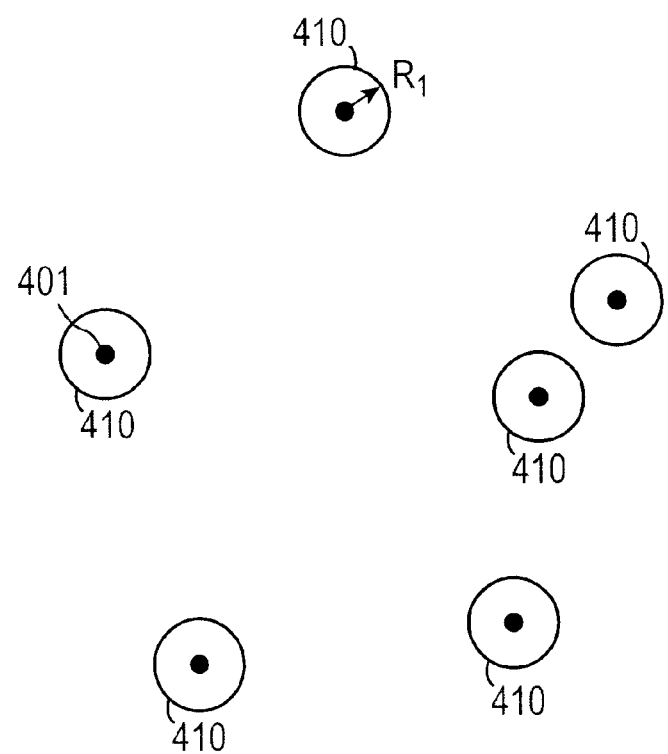
FIGS. 4B to 4D are graphical depictions of one embodiments of determining the attitude of an axis of an aerospace vehicle using three substantially circular astronomical object tracks.

Referring to FIG. 4B, according to the invention, the spin axis of the aerospace vehicle is located on at least one of the circles 410 of radius $R_1$. In some situations, the circles 410 of radius $R_1$ from at least three candidate stars will intersect at a single point (situation not illustrated in FIG. 4B). In such a situation, the RA/DEC coordinates of the single point where the circles intersect are substantially the RA/DEC coordinates of the spin axis. The more general situation, however, is that three or more circles 410 of radius $R_1$ will not intersect at a single point.

Figure 4C:
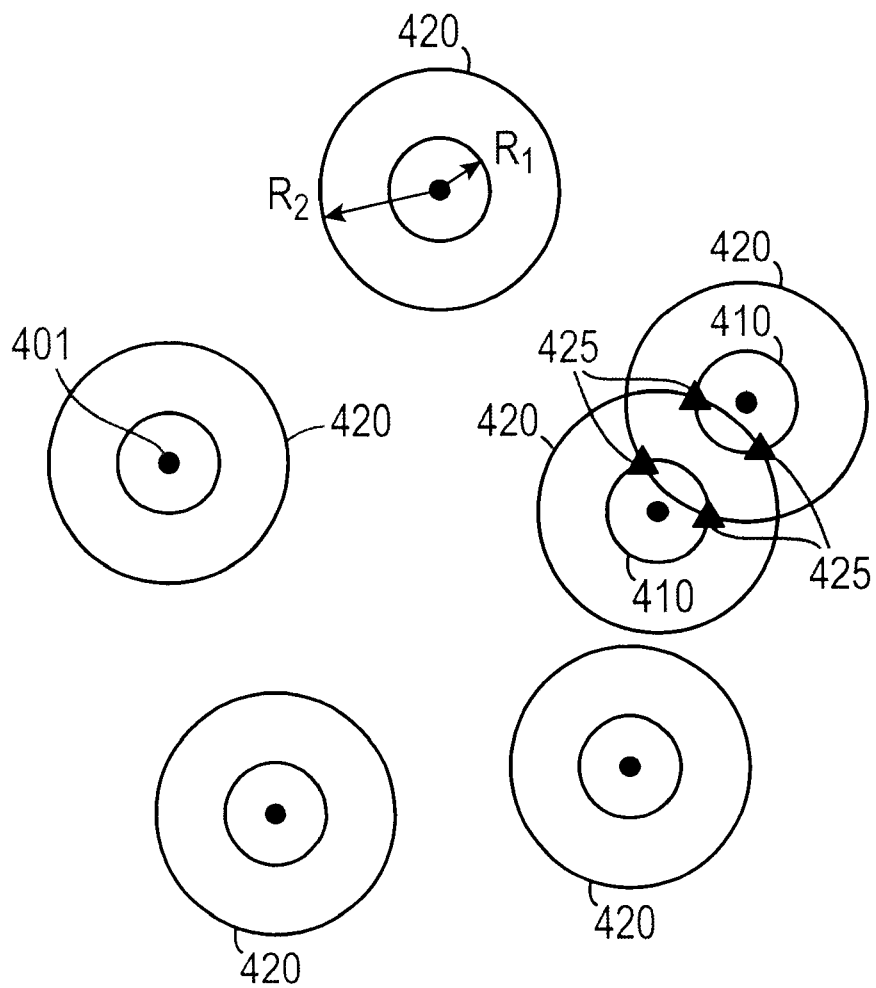

FIG. 4C graphically illustrates the addition of information from the radius $R_2$. According to the invention, the spin axis is located at one of the intersections of the circles of radius $R_1$ 410 and the circles of radius $R_2$ 420 centered on the candidate stars 401. In some situations, there will be a single intersection of at least three circles 410, 420 (situation not illustrated in FIG. 4C). In such a situation, the RA/DEC coordinates of the single point where the circles intersect are substantially the RA/DEC coordinates of the spin axis. The more general situation, however, is that the circles of radii $R_1$ 410 and $R_2$ 420 will intersect at multiple points 425. According to the invention, the RA/DEC coordinates of one of these intersection points 425 are substantially those of the spin axis.

Figure 4D:
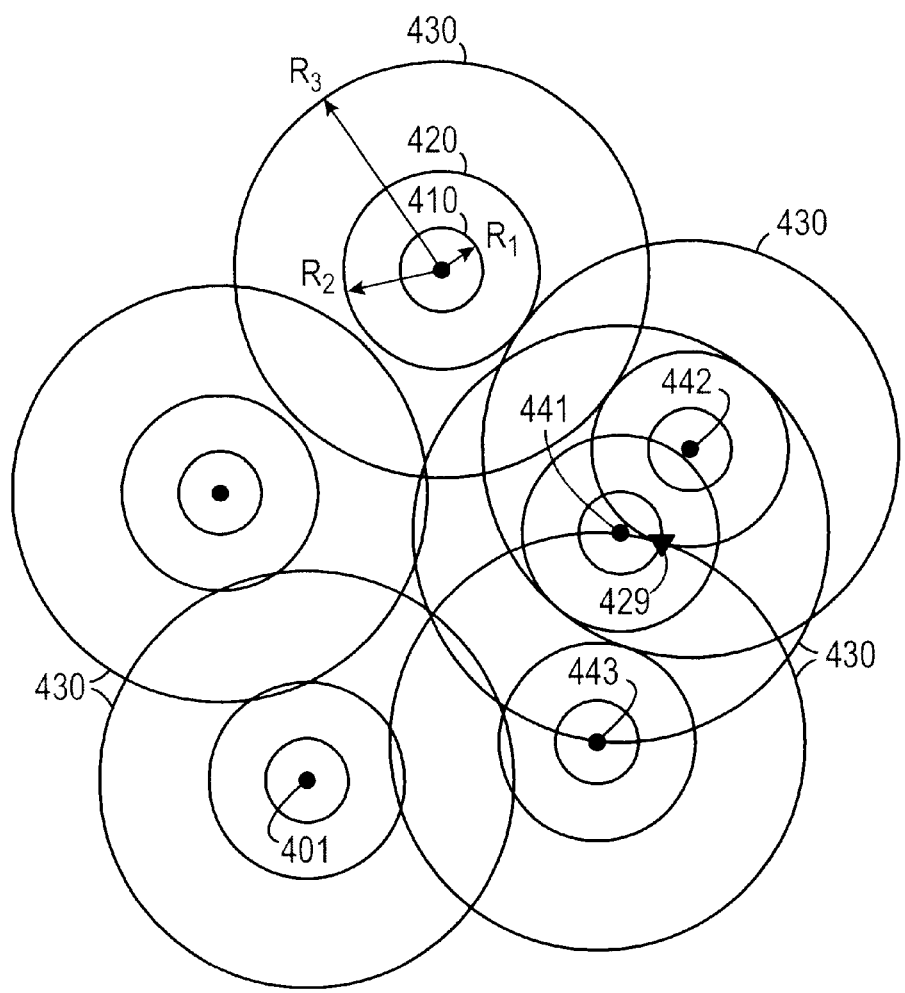

Referring to FIG. 4D, graphically illustrated is the addition of information from radius $R_3$. According to the invention, there will be only a single point 429 where a circle of radius R3 430, a circle of radius $R_2$ 420, and a circle of radius $R_1$ 410 intersect for three non-co-linear stars. The RA/DEC coordinates of the intersection point 429 are substantially those of the spin axis.

It should be understood from at least the graphical illustrations of FIGS. 4A to 4D that according to the invention it is not necessary to identify any of the stars which produce the star tracks to determine the inertial attitude of the spin axis. However, according to the invention, once the spin axis has been located, the stars producing the star tracks may be identified by methods known to one of skill in the art based on the coordinates of the spin axis and the radii of the tracks. For example, referring to FIG. 4D, once the RA/DEC coordinates of the spin axis are known to be those of the intersection point 429, it can be determined that the source of the star track of radius $R_1$ is the candidate star at a distance $R_1$ 441 in the RA/DEC frame from the intersection point 429. Similarly, it can be determined that the source of the star track of radius $R_2$ is the candidate star at a distance $R_2$ 442 and the source of the star track of radius $R_3$ is the candidate star at a distance $R_3$ 443 from the intersection point 429.

Referring again to FIG. 3, the invention provides methods of determining the roll angle of an aerospace vehicle 350. The methods use the inertial attitude of the spin axis to first identify one or more of the stars 352 that are the source of the star tracks. Once one or more of the stars producing the star tracks has been identified, the roll angle of the aerospace vehicle may be determined by methods known to one of skill in the art based on the coordinates of the spin axis and the coordinates of one or more identified stars. In one embodiment, the roll angle is determined from the apparent rotational motion of the identified stars about the spin axis 354. For example, if an apparent rotational motion of 60 degrees about the spin axis of a spinning vehicle is observed, then the vehicle roll angle is 60 degrees.

In another embodiment, once the inertial attitude of the spin axis has been determined, the invention may also determine the inertial attitude of another axis of the aerospace vehicle 360. In one embodiment, the inertial attitude of the other axis is determined based on the spatial and temporal relationship between the other axis and the spin axis 362 using methods known to those of skill in the art. In another embodiment, the inertial attitude of the other axis is determined based on the direction of the spin axis and the roll angle.

As discussed above, the methods of the invention can provide a unique solution for the spin axis using the radii of star tracks from three non-co-linear stars without the need to identify the source of any star track. That the methods of the invention can provide such a solution may be illustrated as follows. Consider three candidate stars and let each candidate star correspond to one of three star tracks. Let (x,y) represent the RA/DEC coordinates of the spin axis, $(x_i, y_i)$ represent the RA/DEC coordinates of three stars, i.e., i=1, 2,3, and $R_j$ represent the radii $R_1$, $R_2$, $R_3$, i.e., j=1,2,3, of the star tracks in RA/DEC coordinates. The uniqueness of the solution for the spin axis direction may be shown as follows. Form three equations k (k=1 to 3) of the form, $$(x-x_k)^2+(y-y_k)^2=R_k^2 \qquad \text{Eq. (3)},$$

where i=k and j=k. Although $R_j$ may be the radius of the track produced by star i, Equation 3 should not be read to imply that $R_j$ must be the radius of the track produced by star i. For example, the k equations formed according to Equation 3 may associate a star i with a radius not produced by that star, for instance, star i=1 may produce the track with radius $R_{j=3}$, star i=2 may produce the track with radius $R_{j=1}$, and star i=3 may produce the track with radius $R_{j=1}$. Nevertheless, a unique solution for the spin axis RA/DEC coordinates will result for three non-co-linear stars.

The unique solution may then be demonstrated and determined with, for example, linear algebra. For example, expand the squares of the three equations k and form a linear matrix equation, such as, $$\begin{pmatrix}(x_2-x_1) & (y_2-y_1)\\(x_3-x_1) & (y_3-y_1)\end{pmatrix}\begin{pmatrix}x\\y\end{pmatrix}=\begin{pmatrix}M_1\\M_2\end{pmatrix}, \qquad \text{Eq. (4)}$$

where M1 is, $$M_1=(\tfrac{1}{2})(R_1^2-R_2^2+x_2^2-x_1^2+y_2^2-y_1^2)^2 \qquad \text{Eq. (5)},$$

and M2 is, $$M_2=(\tfrac{1}{2})(R_1^2-R_3^2+x_3^2-x_1^2+y_3^2y_1^2)^2 \qquad \text{Eq. (6)}.$$

Equation 4 may then be solved for x and y to provide the RA/DEC coordinates of the spin axis. For example, x may be found from.

$$x=\frac{\begin{vmatrix}M_1 & (y_2-y_1)\\M_2 & (y_3-y_1)\end{vmatrix}}{\begin{vmatrix}(x_2-x_1) & (y_2-y_1)\\(x_3-x_1) & (y_3-y_1)\end{vmatrix}}, \qquad \text{Eq. (7)}$$

and y from, $$y=\frac{\begin{vmatrix}(x_2-x_1) & M_1\\(x_3-x_1) & M_2\end{vmatrix}}{\begin{vmatrix}(x_2-x_1) & (y_2-y_1)\\(x_3-x_1) & (y_3-y_1)\end{vmatrix}}. \qquad \text{Eq. (8)}$$

Equations 7 and 8 demonstrate that when the determinates in their denominators are non-zero, there is a unique solution for the coordinates (x,y) of the spin axis. Further, from Equations 7 and 8, it can be seen that if the three stars are co-linear, then the determinates in the denominators of these equations are zero and the values of x any y may become infinite.

Figure 5A:
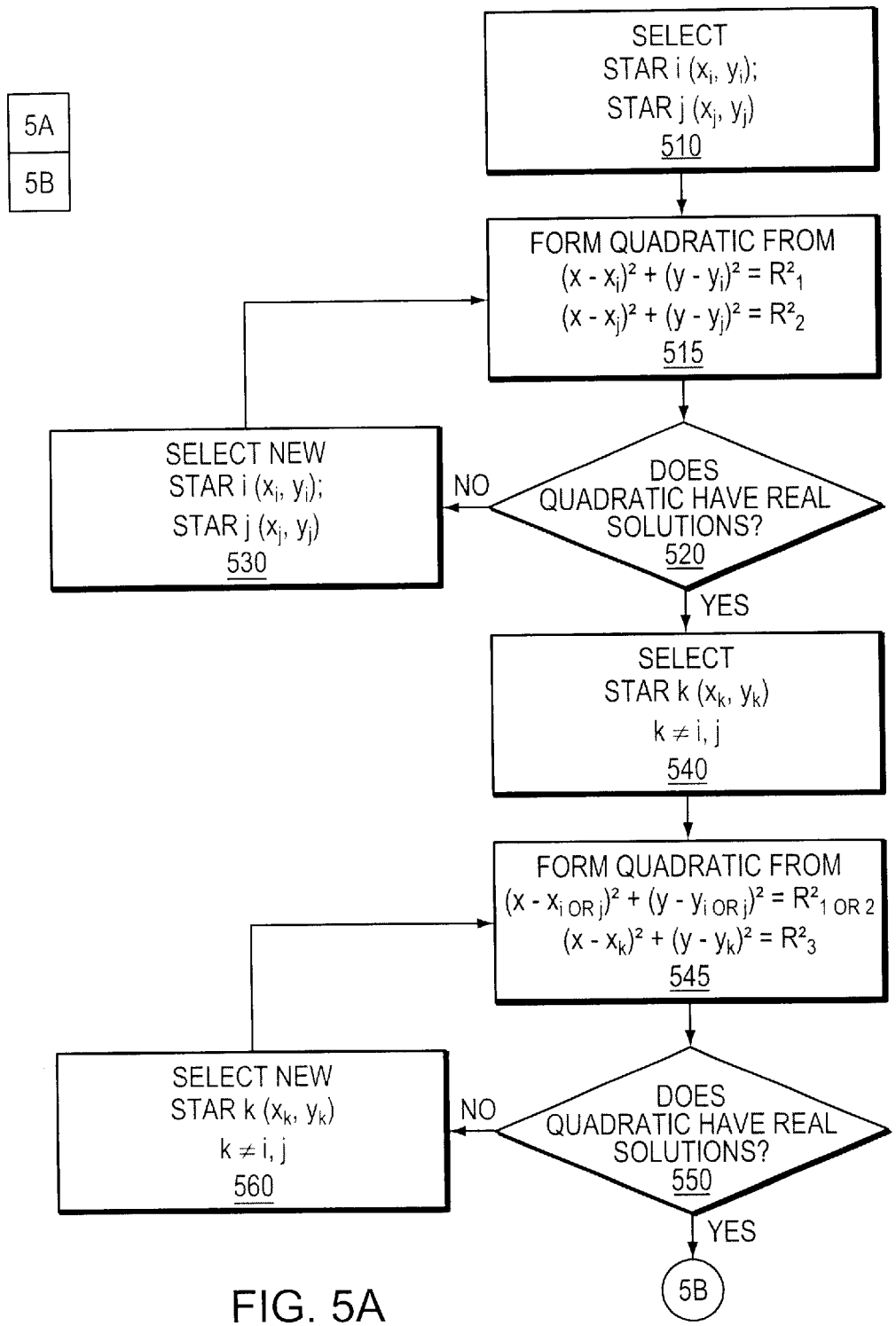
FIGS. 5A and 5B is a flow diagram of one embodiment of determining the attitude of an axis of an aerospace vehicle from three radii.
Figure 5B:
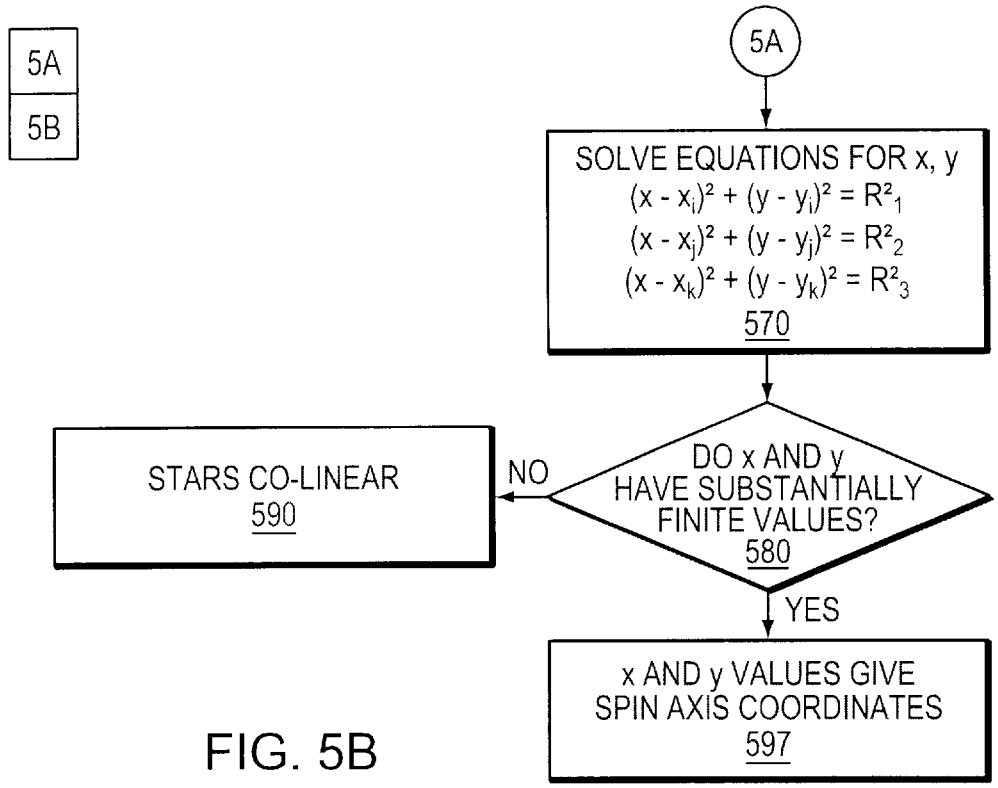

Referring to FIGS. 5A and 5B, another embodiment of a method of determining an attitude of an axis of an aerospace vehicle is illustrated. FIGS. 5A and 5B are a flow diagram illustrating a general method of determining the inertial attitude of the spin axis with coordinates (x,y), where there are m star candidates and three or more star tracks.

The method begins with the selection of two candidate stars 510, star i with coordinates $(x_i, y_i)$, and star j with coordinates $(x_j, y_j)$. A quadratic equation for either x or y is then formed 515 from the equations, $$(x-x_i)^2+(y-y_i)^2=R_1^2 \qquad \text{Eq. (9)},$$

and $$(x-x_j)^2+(y-y_j)^2=R_2^2 \qquad \text{Eq. (10)},$$

where $R_1$ and $R_2$ are the two largest radii of the star tracks. For example, the square terms of Equations 9 and 10 may be expanded and the resultant equations rearranged to yield an equation of the form, $$Ax^2+Bx+C=0 \qquad \text{Eq. (11)},$$

where A, B and C are constants dependent on the values of $x_i$, $y_i$, $x_j$, $y_j$, $R_1$, and/or $R_2$. If the quadratic equation has imaginary solutions, then neither star i nor star j is a source of any of the star tracks ("NO" to query 520). Where the quadratic equation has imaginary solutions, new candidate stars i and j, with new coordinates $(x_i, y_i)$ and $(x_j, y_j)$, are selected 530 and the quadratic formation step 515 repeated. The selection step 530 and quadratic formation step 515 are repeated for all two star combinations of the m star candidates until the quadratic equation has real solutions ("YES" to query 520).

In another embodiment, the method of FIGS. 5A and 5B excludes certain star candidate combinations from the selection steps 510, 530. As discussed above, since the methods of the invention do not need to identify the stars, it is not necessary to consider all possible 2 star permutations of the m star candidates. Preferably, two star combinations that could not appear in the FOV of the optical sensor are also excluded from the selection steps 510, 530. Examples of such a combination include, but are not limited to, stars that could not appear together in the FOV due to their angular separation.

Where the quadratic equation has real solutions ("YES" to query 520), then star i is the source of one of the star tracks, and star j the source of another of the star tracks. Subsequently, a star candidate k with coordinates $(x_k, y_k)$ is selected 540, where star k is not any previously selected star i or star j, and a quadratic equation for either x or y is then formed 545 from the equations, $$(x-x_{i\,or\,j})^2+(y-y_{i\,or\,j})^2=R_{1\,or\,2}^2 \qquad \text{Eq. (12)},$$

and $$(x-x_k)^2+(y-y_k)^2=R_3^2 \qquad \text{Eq. (13)},$$

where Equation 12 may use either the coordinates of star i or star j, and either radius $R_1$ or $R_2$.

If the quadratic equation has imaginary solutions, then star k is not a source of any of the star tracks ("NO" to query 550), a new candidate star k is selected 560, and the quadratic formation step 545 repeated. The selection step 560 and quadratic formation step 545 are repeated until the quadratic equation has real solutions ("YES" to query 550).

Where the quadratic equation has real solutions ("YES" to query 550), then star k is the source of one of the star tracks. Equations of the form, $$(x-x_i)^2+(y-y_i)^2=R_1^2 \qquad \text{Eq. (14)},$$

$$(x-x_j)^2+(y-y_j)^2=R_2^2 \qquad \text{Eq. (15)},$$

and $$(x-x_k)^2+(y-y_k)^2=R_3^2 \qquad \text{Eq. (16)},$$

may then be solved for the spin axis coordinates (x, y) 570. For example, x may be found from, $$x = \frac{\begin{vmatrix} M_1 & (y_2 - y_1) \\ M_2 & (y_3 - y_1) \end{vmatrix}}{\begin{vmatrix} (x_2 - x_1) & (y_2 - y_1) \\ (x_3 - x_1) & (y_3 - y_1) \end{vmatrix}}, \qquad \text{Eq. (17)}$$

and y from, $$y = \frac{\begin{vmatrix} (x_2 - x_1) & M_1 \\ (x_3 - x_1) & M_2 \end{vmatrix}}{\begin{vmatrix} (x_2 - x_1) & (y_2 - y_1) \\ (x_3 - x_1) & (y_3 - y_1) \end{vmatrix}}. \qquad \text{Eq. (18)}$$

where M1 is, $$M_1=(\tfrac{1}{2})(R_1^2-R_2^2+x_2^2x_1^2+y_2^2-y_1^2)^2 \qquad \text{Eq. (19)},$$

and M2 is, $$M_2=(\tfrac{1}{2})(R_1^2-R_3^2+x_3^2-x_1^2+y_3^2-y_1^2)^2 \qquad \text{Eq. (20)}.$$

If the values of x and y are not substantially finite ("NO" to query 580), then the three stars i, j, k may be co-linear 590. Otherwise, if the values of x and y are substantially finite ("YES" to query 580), then the three stars i, j, k are non-co-linear and the inertial attitude of the spin axis of the aerospace vehicle is substantially given by the coordinates (x, y) 597. Other radii $R_4$, $R_5$, etc., may be substituted for $R_1$, $R_2$, or $R_3$, in Equations 14 to 16 to confirm and/or increase the accuracy of the determination of the inertial attitude of the spin axis.

In another aspect, the invention provides an attitude measurement apparatus comprising a high sensitivity optical sensor and a low power inertial sensor. In one embodiment, the attitude measurement apparatus comprises an optical sensor able to detect astronomical objects of relative magnitude 7 or fainter and an inertial sensor having a gyro rate drift of greater than 1 degree per hour. In one embodiment, the average power consumption of the attitude sensor apparatus is about three Watts or less.

In one embodiment, power requirements can be reduced even further for a spinning aerospace vehicle by turning off the optical sensor, e.g., star tracker, between updates. In versions of this embodiment, lower-power gyros (e.g., such as MEMS gyros) are kept running to correct for nutation, rotation, etc. occurring between updates. As a result, the inertial sensor can provide inertial memory when the optical sensor is not in operation. For example, if there is undesired nutation of the spin axis, the inertial sensor (even one of modest performance) can measure and compensate for the nutation. As a result, the power requirements of the optical sensor, and associated electronics, can then be averaged over the update duty cycle.

Figure 6A:
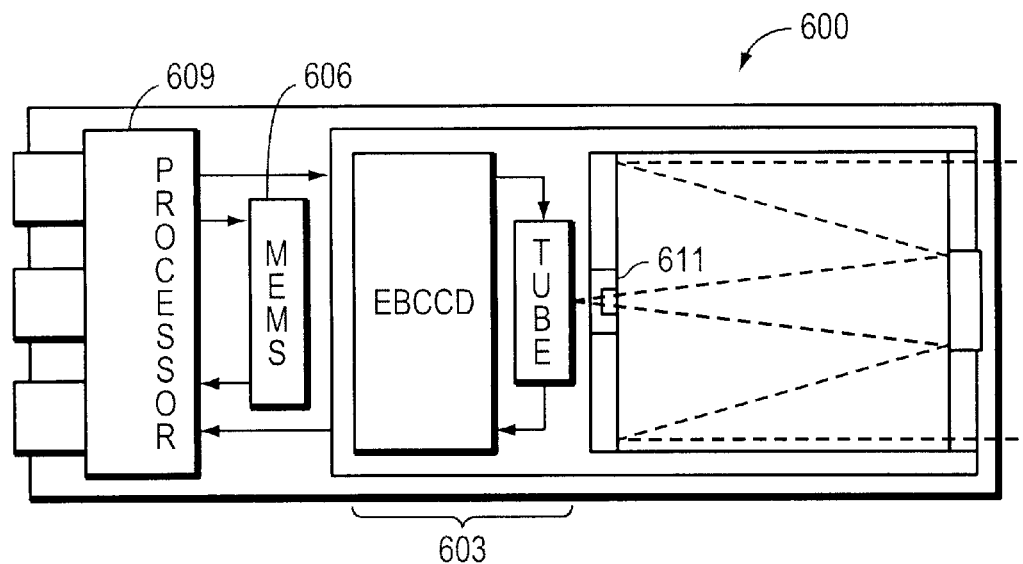
FIGS. 6A–6C are schematic views of one embodiment of an attitude measurement apparatus according to the present invention, where 6A is a side view, 6B a back view, and 6C a front view.
Figure 6B:
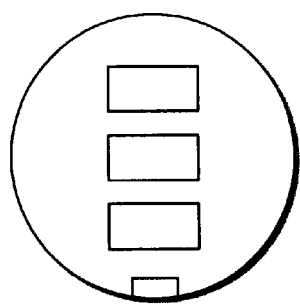
Figure 6C:
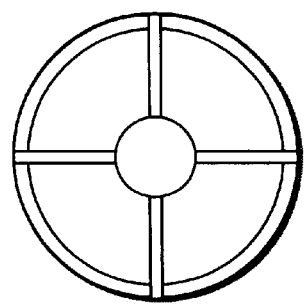

Preferably, the attitude measurement apparatus comprises an electron bombarded charge coupled device (EBCCD) as an optical sensor and a MEMS gyroscope as an inertial sensor. Referring to FIGS. 6A–6C, one embodiment of an attitude measurement apparatus 600, comprising an EBCCD optical sensor 603 and a MEMS inertial sensor 606, is shown. The apparatus may further include a processor 609 to provide, for example, control logic that affects optical sensor control, acquisition of astronomical object tracks, radii determination, inertial sensor control, attitude determination, astronomical object identification, optical sensor updates, inertial sensor updates, and the operations with and on the data stored in memory elements of the processor 609. Accordingly, the apparatus may further include several memory elements. In one particular embodiment, the apparatus further includes: (1) a first memory element that stores the radii of curved tracks of two or more astronomical objects; and (2) a second memory element that stores right ascension and right declination information on a plurality of astronomical objects. The memory elements may be portions of the random access memory of a computer, and/or discreet memory elements of a computer, or a processor. As illustrated in FIG. 6A, the memory elements include portions of the random access memory and/or discreet memory elements of a processor 609.

The EBCCD optical sensor 603 of the attitude measurement apparatus 600 provides the ability to detect dim astronomical objects (those of relative magnitude 8 and higher) and obtain curved tracks of astronomical objects that may be used to determine the inertial attitude of an axis of an aerospace vehicle according to the methods of the invention. Other advantages of an EBCCD optical sensor include, but are not limited to, its resolution, small size, and radiation tolerance. In addition, CMOS imaging arrays may be adapted into EBCCD systems and thereby further reduce the power requirements of the attitude measurement system 600. For example, the use of a radiation tolerant CMOS imaging array could provide very low power (0.5 watt) operation and small size through integration on a chip.

The EBCCD optical sensor 603 may be operated in several configurations. For example, when adapted for a 3-axis stabilized aerospace vehicle, the EBCCD optical sensor can be configured from a wide FOV of about 40 degree, to a narrow FOV of 2 degrees or less. In a wide FOV configuration, the EBCCD detection threshold can be raised (or the aperture 611 reduced) to limit the number of dim astronomical objects observed and simplify the bright star recognition problem. With a narrow FOV, the full EBCCD sensitivity can be used to, for example, facilitate pattern recognition from a limited celestial area star catalog without the need for drag-back. For example, in either a 3-axis stabilized wide FOV or a 3-axis narrow FOV configuration, after initialization of the EBCCD optical sensor from a sleep mode, the EBCCD optical sensor can detect the signal stars even at initial roll angles of 100 degrees/second In addition, with the small FOV, the EBCCD optical sensor can meet a 2 arc-second centroid measurement accuracy.

The EBCCD optical sensor may also be adapted for a spinning aerospace vehicle. For example, for a 20-RPM spinner application, design considerations and performance description are generally as follows. To avoid time delay and integration (TDI), a 60 Hz EBCCD optical sensor can be oriented along the spin vector (i.e., spin axis) with a small FOV (about 2 degrees or less) to detect relatively dim astronomical objects. The dim astronomical objects detected will trace circular patterns around the spin axis in the EBCCD FOV. The 3 seconds of rotation data at 60 Hz provide the equivalent integration of the star signal obtained from traditional "drag-back" procedures. Thus, the EBCCD optical sensor eliminates the need to implement a relatively complex dragback procedure.

The MEMS inertial sensor 606 of the attitude measurement apparatus 600 provides the ability to compensate for nutation in the astronomical object tracks obtained by the optical sensor 603, can provide smoothing for astronomical object—sighting gaps, and a high-bandwidth reference for closed-loop attitude control. Other advantages of a MEMS gyroscope inertial sensor 606 are its very low power, size, and weight relative to its performance. For example, in one embodiment of a single-axis MEMS gyro inertial sensor, the MEMS is 0.35 cubic inches in volume, consumes only 50 mW of power and has a mass of less than 20 grams. In addition, the size, weight and power of such a MEMS gyro is low enough that multiple redundancy can be considered to improve system reliability.

The combination of the high sensitivity EBCCD optical sensor with a low power inertial sensor in the apparatus of the invention provides a system synergy where the modest performance of the inertial sensor is enhanced by the high sensitivity optical sensor, which is adapted to operate as a star tracker (stellar camera), and the inertial sensor is adapted to enhance the astronomical object tracking operation of the optical sensor. The MEMS inertial sensor enhances the performance of the EBCCD optical sensor by providing smoothing for astronomical object-sighting gaps and information for nutation compensation. The EBCCD enhances the performance of the MEMS by compensating for the MEMS inertial drift error.

For example, for a spinning aerospace vehicle, when the optical sensor 603 and/or inertial sensor 606 are powered on, the vehicle spin is present and the star radii are measured. In this "re-awake" mode, the RA/DEC coordinates of the vehicle are determined according to the methods of the invention. The drifts of the pitch and yaw gyros can then be updated by using the inertially stabilized spin axis (determined via the optical sensor) as an inertial reference for the pitch and yaw axes and a sun sensor can update the drift and scale factor errors of the roll gyro along the spin axis. In one embodiment, these updates can hold the MEMS inertial sensor to within a 0.1 degree inertial measurement unit (IMU) characteristic.

For a 3-axis stabilized aerospace vehicle, periodic external optical updates (e.g., every 5 minutes) of the MEMS gyros can provide drift compensation that will improve the resultant gyro performance. In addition, in for spinning and stabilized aerospace vehicles, the attitude measurement apparatus may further include Kalman filter to model, for example, the temperature disturbance and further improve MEMS gyro performance.

In another aspect, the invention provides an attitude determination system. In one embodiment, the system includes: (1) an optical sensor; (2) a first memory element that stores the radii of curved tracks of two or more astronomical objects; (3) a second memory element that stores right ascension and right declination information on a plurality of astronomical objects; and (4) an attitude processor accessing the first memory element and second memory element to determine an attitude of an axis of the aerospace vehicle.

The memory elements may be portions of the random access memory of a computer, and/or discreet memory elements of a computer, or an attitude processor. The memory elements described herein may be discreet memory elements that receive data and are accessed by the attitude processor. Alternately, the memory elements may refer to a portion of random access memory, which is set aside to store the data transmitted thereto.

Figure 7A:
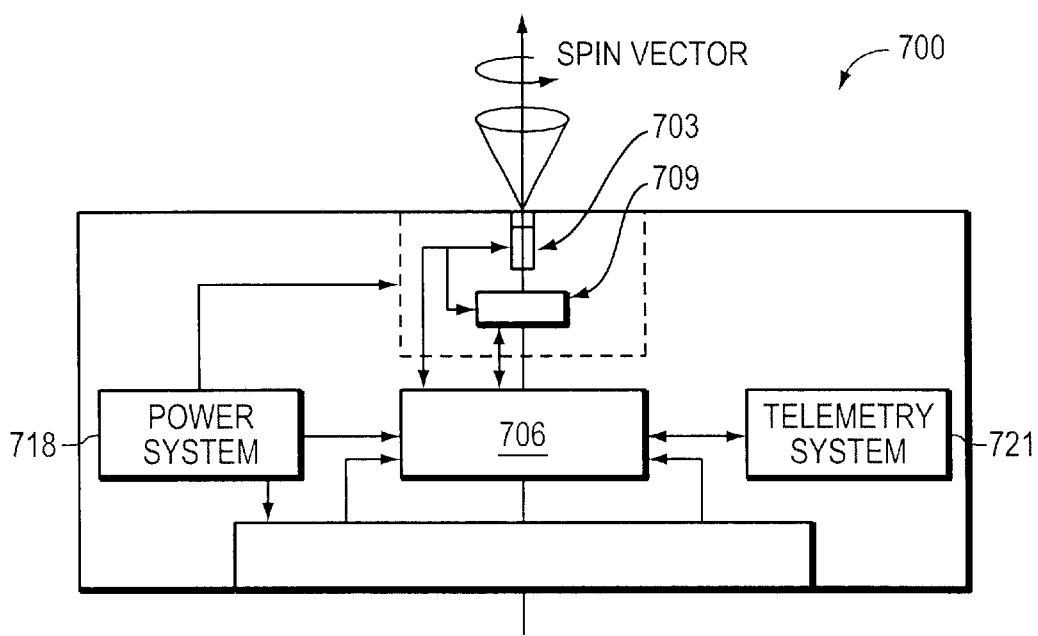
FIGS. 7A and 7B are schematic illustrations of various embodiments of an attitude determination system for an aerospace vehicle according to the present invention.
Figure 7B:
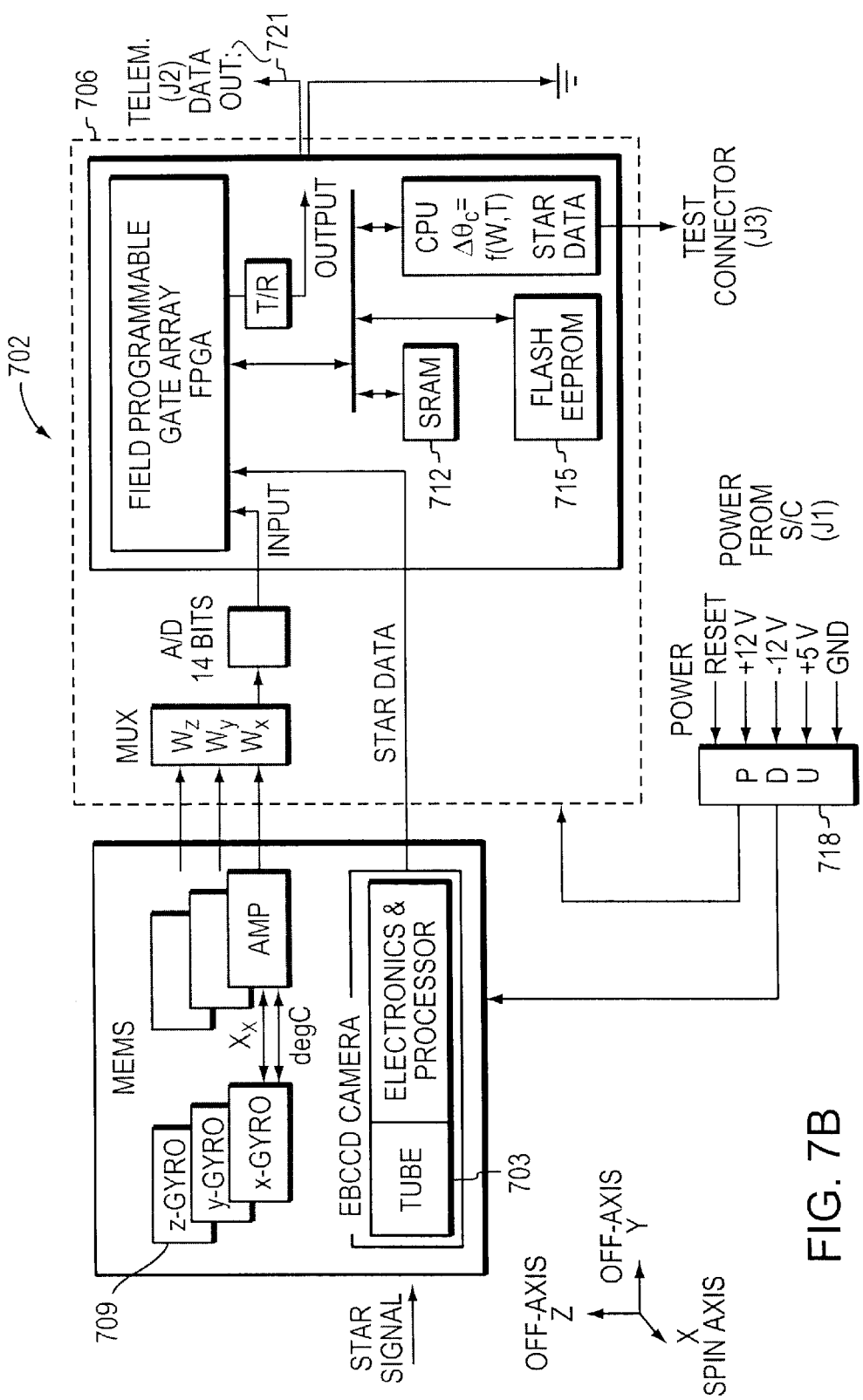

In another embodiment, the attitude determination system further includes an inertial sensor. Referring to FIGS. 7A and 7B, various embodiments of an attitude determination system 700, 702 comprising an optical sensor 703, an attitude processor 706, an inertial sensor 709, and discreet memory elements 712, 715, are shown. In one embodiment, the system further includes a power distribution unit (PDU) 718 and a telemetry system 721. As illustrated in FIG. 7A, the memory elements include portions of the random access memory and/or discreet memory elements of the attitude processor 706. In one embodiment, the continuous power budget is 2W for the optical sensor 703, 1 W for the MEMS gyros 709 and 1W for the attitude processor 706.

In some embodiments, the functionality of the methods described above may be implemented as software on a general purpose computer. The computer may be separate from, detachable from, or integrated into an attitude measurement apparatus or attitude determination system. In addition, such a program may set aside portions of a computer's random access memory to provide control logic that affects optical sensor control, acquisition of astronomical object tracks, radii determination, inertial sensor control, attitude determination, astronomical object identification, optical sensor updates, inertial sensor updates, and the operations with and on the data stored in the memory elements. In such an embodiment, the program may be written in any one of a number of high-level languages, such as FORTRAN, PASCAL, C, C++, or BASIC. Further, the program may be written in a script, macro, or functionality embedded in commercially available software, such as EXCEL or VISUAL BASIC. Additionally, the software could be implemented in an assembly language directed to a microprocessor resident on a computer. For example, the software could be implemented in Intel 80×86 assembly language if it were configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of determining the attitude of an aerospace vehicle comprising the steps of:
   determining a first radius of a substantially circular track of a first astronomical object;
   determining a second radius of a substantially circular track of a second astronomical object;
   determining a third radius of a substantially circular track of a third astronomical object; and
   determining an attitude of a first axis of an aerospace vehicle based on the first, second and third radii.

2. The method of claim 1 further comprising the step of:
   measuring a change in an output of an inertial sensor on board the aerospace vehicle; and
   compensating for drift of the inertial sensor based on the measured change in the output of the inertial sensor and the attitude of the first axis of the aerospace vehicle.

3. The method of claim 2 wherein the change in output of the inertial sensor is consistent with a pitch motion of the aerospace vehicle.

4. The method of claim 2 wherein the change in output of the inertial sensor is consistent with a yaw motion of the aerospace vehicle.

5. The method of claim 1 further comprising the steps of:
   using an inertial sensor on board the aerospace vehicle to provide inertial memory data; and
   compensating for nutation of the aerospace vehicle based on the inertial memory data.

6. The method of claim 1 wherein the aerospace vehicle is an artificial satellite.

7. The method of claim 1 wherein the aerospace vehicle is a spinning artificial satellite.

8. The method of claim 1 wherein the aerospace vehicle is a three axis stabilized artificial satellite.

9. The method of claim 1 wherein the first, second, and third astronomical objects are stellar objects.

10. The method of claim 1 further comprising the step of:
    accessing a reference source of astronomical objects to determine the right ascension and the right declination of at least one of the first, second, and third astronomical objects.

11. An article of manufacture having computer-readable program means for performing the method of claim 1 embodied thereon.

12. A method of determining the attitude of an aerospace vehicle comprising the steps of:
    using an optical sensor to obtain a first curved track of a first astronomical object, a second curved track of a second astronomical object, and a third curved track of a third astronomical object;
    determining a first radius of the first curved track, a second radius of the second curved track, and a third radius of the third curved track; and
    determining an attitude of a first axis of an aerospace vehicle based on the first, second and third radii and a focal length of the optical sensor.

13. The method of claim 12 further comprising the steps of:
    using an inertial sensor on board the aerospace vehicle to provide inertial memory data; and
    compensating for nutation of the aerospace vehicle in the determination of at least one of the first, second, and third radii based on the inertial memory data.

14. The method of claim 12 wherein the step of determining an attitude further comprises:
    accessing a reference source of astronomical objects to determine the right ascension and the right declination of at least one of the first, second, and third astronomical objects.

15. An article of manufacture having computer-readable program means for performing the method of claim 12 embodied thereon.

16. An attitude measurement apparatus comprising:
    an optical sensor comprising an aperture no greater than about two degrees for detecting astronomical objects of about relative magnitude 7 or fainter; and
    an inertial sensor comprising a gyroscope having a gyro rate drift of greater than 1 degree per hour.

17. The attitude measurement apparatus of claim 16 having an average power consumption of less than about three Watts.

18. The attitude measurement apparatus of claim 16 wherein the attitude measurement apparatus is capable of determining the right ascension and right declination of an axis of an aerospace vehicle to an accuracy within a tenth of a degree.

19. The attitude measurement apparatus of claim 16 wherein the inertial sensor comprises a microelectromechanical gyroscope.

20. The attitude measurement apparatus of claim 16 wherein the optical sensor comprises an electron bombarded charge coupled device.

21. An attitude determination system for an aerospace vehicle comprising:
    an optical sensor;
    a first memory element in electrical communication with the optical sensor and storing the radii of curved tracks of two or more astronomical objects;
    a second memory element storing right ascension and right declination information on a plurality of astronomical objects; and
    an attitude processor accessing the first memory element and second memory element to determine an attitude of an axis of the aerospace vehicle.

22. The attitude determination system of claim 21 further comprising an inertial sensor.

* * * * *